US012768384B2

(12) United States Patent
Xia

(10) Patent No.: US 12,768,384 B2
(45) Date of Patent: Oct. 20, 2026

(54) TENSILE ROD AND BRACKET

(71) Applicant: CraftGeek LLC, Irvine, CA (US)

(72) Inventor: Meihua Xia, Shenzhen City (CN)

(*) Notice: Subject to any disclaimer, the term of this patent is extended or adjusted under 35 U.S.C. 154(b) by 203 days.

(21) Appl. No.: 17/970,018

(22) Filed: Oct. 20, 2022

(65) Prior Publication Data

US 2023/0130809 A1 Apr. 27, 2023

(51) Int. Cl.
*F16B 7/14* (2006.01)

(52) U.S. Cl.
CPC .................................. *F16B 7/1445* (2013.01)

(58) Field of Classification Search
CPC .... F16B 7/1463; F16B 7/1445; F16B 7/1472; F16B 7/1481; F16B 2/04; F16B 2200/406
See application file for complete search history.

(56) References Cited

U.S. PATENT DOCUMENTS 1,919,114 A * 7/1933 Ley ......................... F21V 21/22 403/112
2,952,485 A * 9/1960 Hammond ........... A47B 19/002 248/161
5,400,995 A * 3/1995 Boyd .................. A61M 5/1415 248/407
7,229,230 B2 * 6/2007 Choy .................... F16B 7/1463 403/314
7,302,745 B2 * 12/2007 Stahle ..................... A47L 9/244 403/374.1
7,967,261 B2 * 6/2011 Wilcox ................. F16B 7/1463 403/109.5
8,500,357 B2 * 8/2013 Stahle ................... F16B 7/1463 403/374.4
11,181,228 B2 * 11/2021 Akiba .................... F16M 11/28
2003/0053858 A1 * 3/2003 Choy .................... F16B 7/1463 403/374.4
2021/0180747 A1 * 6/2021 Akiba ....................... F16B 7/14

FOREIGN PATENT DOCUMENTS

CN 204646899 U * 9/2015
CN 206234215 U * 6/2017

OTHER PUBLICATIONS

Dongguan, Extension Rod, Espacenet english translation of CN 206234215 U, Jun. 9, 2017. (Year: 2017).*

* cited by examiner

*Primary Examiner* — Amber R Anderson
*Assistant Examiner* — Zachary A Hall
(74) *Attorney, Agent, or Firm* — The Law Office of Austin Bonderer, PC; D. Austin Bonderer

(57) ABSTRACT

The utility model discloses a tensile rod and a bracket. The tensile rod includes a first pulling rod, a second pulling rod, and an extruding assembly. The first pulling rod has a pulling end and an inserting end that are opposite to each other. An inserting end of the second pulling rod is removably interposed in the first pulling rod. The extruding assembly is mounted at the inserting end of the second pulling rod and abuts against an inner wall of the first pulling rod to provide a uniform extruding friction force from the inserting end of the second pulling rod to the inner wall of the first pulling rod. The utility model improves the structure of the tensile rod, improves the support stability of the tensile rod, and extends the service life of the tensile rod.

10 Claims, 4 Drawing Sheets

TENSILE ROD AND BRACKET

FIELD

The utility model relates to the technical field of a pulling rod, and in particular to a tensile rod and a bracket.

BACKGROUND

In some scenarios of life, there is a need to flexibly change a length and height of a product. Therefore, various brackets with tensile rods and so on have emerged. At present, there are many tensile rods on the market that have poor stability and cannot carry an object stably, making it difficult to meet the needs of some special scenarios.

SUMMARY

A main objective of the utility model is to provide a tensile rod and a bracket aimed at improving stability of the tensile rod.

To achieve the above objective, the utility model proposes a tensile rod, including:

- a first pulling rod;
- a second pulling rod having a pulling end and an inserting end that are opposite to each other, an inserting end of the second pulling rod being removably interposed in the first pulling rod; and
- an extruding assembly mounted at the inserting end of the second pulling rod and abutting against an inner wall of the first pulling rod to provide a uniform extruding friction force from the inserting end of the second pulling rod to the inner wall of the first pulling rod.

Optionally, both sides of the inserting end of the second pulling rod are both provided with mounting holes, and the extruding assembly includes:

- a first friction seat provided with a first connecting arm;
- a second friction seat provided with a second connecting arm at a position corresponding to the first connecting arm, the second friction seat and the first friction seat being enclosed to form a sleeve, the sleeve being sleeved at the inserting end of the second pulling rod and being located between the first pulling rod and the second pulling rod; wherein the first connecting arm and the second connecting arm are inserted into the mounting hole and abut against each other to form an extruding column; and
- an elastic member sleeved on the extruding column.

Optionally, the elastic member is a spring or a plastic elastomer.

Optionally, both sides of the inserting end of the second pulling rod are provided with two mounting holes, respectively. The two first connecting arms and the two second connecting arms are both provided to form two sets of the extruding columns, and the elastic member is arranged on each of the extruding columns.

Optionally, the first connecting arm and the second connecting arm are locked and fixed by a screw; or the first connecting arm and the second connecting arm are fixed by a rivet; or the first connecting arm and the second connecting arm are fixed by clamping connection; or the first connecting arm and the second connecting arm are fixed by the rivet and fixed by hot melt connection.

Optionally, the extruding assembly further includes a friction sheet, and the friction sheet is arranged between the sleeve and the first pulling rod.

Optionally, the two friction sheets are provided. The two friction sheets are affixed to the first friction seat and the second friction seat, respectively; or one of the friction sheets is integral with the first friction seat, and the other of the friction sheets is integral with the second friction seat.

Optionally, the friction sheet is made of metal or plastic cement.

Optionally, one end of the first pulling rod near the second pulling rod is provided with a rod sleeve to limit the second pulling rod from being escaped from the first pulling rod.

To achieve the above objective, the utility model also proposes a bracket, as described above, including a tensile rod. The tensile rod includes:

- a first pulling rod;
- a second pulling rod having a pulling end and an inserting end that are opposite to each other, an inserting end of the second pulling rod being removably interposed in the first pulling rod; and
- an extruding assembly mounted at the inserting end of the second pulling rod and abutting against an inner wall of the first pulling rod to provide a uniform extruding friction force from the inserting end of the second pulling rod to the inner wall of the first pulling rod.

In the technical solution of the utility model, the tensile rod includes the first pulling rod, the second pulling rod, and the extruding assembly. The first pulling rod has the pulling end and the inserting end that are opposite to each other. The inserting end of the second pulling rod is removably interposed in the first pulling rod. The extruding assembly is mounted at the inserting end of the second pulling rod and abuts against the inner wall of the first pulling rod to provide the uniform extruding friction force from an outer peripheral wall of the inserting end of the second pulling rod to an inner peripheral wall of the first pulling rod. The extruding assembly is arranged between the first pulling rod and the second pulling rod to provide a uniform extruding pressure to the first pulling rod, so that a friction force between the first pulling rod and the second pulling rod is evenly distributed, thereby improving the stability of the tensile rod and extending service life.

BRIEF DESCRIPTION OF THE DRAWINGS

In order to explain embodiments of the utility model or the technical solutions in the prior art more clearly, the following briefly introduces the drawings that need to be used in the embodiments or the prior art. Obviously, the drawings in the following description are only some of the embodiments of the utility model. Those skilled in the art can obtain other drawings based on structures shown in these drawings without creative labor.

Figure 1:
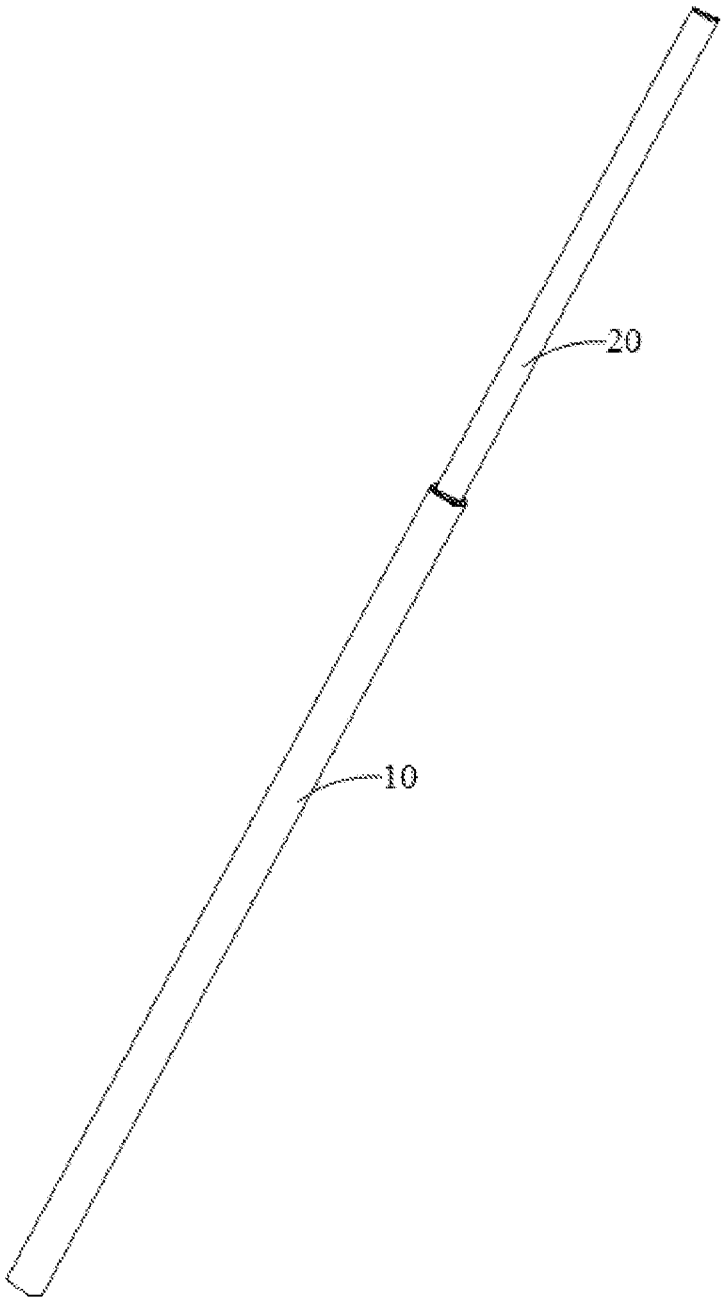
FIG. 1 is a schematic structural diagram of an embodiment of a tensile rod of the utility model.

The realization, functional characteristics, and advantages of the objective of the utility model will be further described with reference to the drawings in conjunction with the embodiments.

DETAILED DESCRIPTION

The following clearly and completely describes the technical solutions in embodiments of the utility model in conjunction with the drawings in the embodiments of the utility model. Obviously, the described embodiments are only a part of the embodiments of the utility model rather than all embodiments. Based on the embodiments of the utility model, all other embodiments obtained by those skilled in the art without creative labor shall fall within the protection scope of the utility model.

It should be noted that if the embodiments of the utility model involve directional indications (such as up, down, left, right, front, back . . . ), the directional indications are only used to explain a relative position relationship and movement among various components under a certain posture (as shown in the drawings). If a specific posture changes, the directional indication also changes accordingly.

In addition, if there are descriptions of terms such as "first", "second" and the like in the embodiments of the utility model, the descriptions of the terms such as "first", "second" and the like are merely intended for the purpose of description, and shall not be understood as an indication or implication of relative importance or implicit indication of a quantity of indicated technical features. Therefore, the features defined with "first" and "second" can explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions between the various embodiments can be combined with each other but should be based on what can be achieved by those skilled in the art. When a combination of technical solutions is contradictory or cannot be achieved, it should be considered that such a combination of technical solutions does not exist and also does not fall within the scope of protection required by the utility model.

DESCRIPTION OF REFERENCE SIGNS

10. First pulling rod; 20. Second pulling rod; 30. Extruding assembly; 31. First friction seat; 32. Second friction seat; 33. Elastic member; 311. First connecting arm; 321. Second connecting arm; 34. Friction sheet; 11. Rod sleeve.

This utility model proposes a tensile rod, which is suitable for a bracket, etc., and is not limited here.

Figure 2:
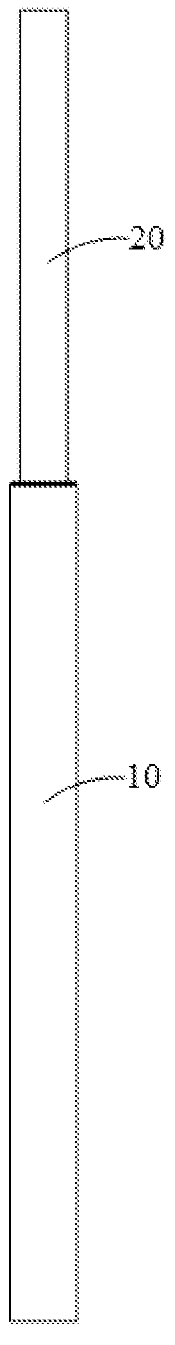
FIG. 2 is a front view of an embodiment of a tensile rod of the utility model.
Figure 3:
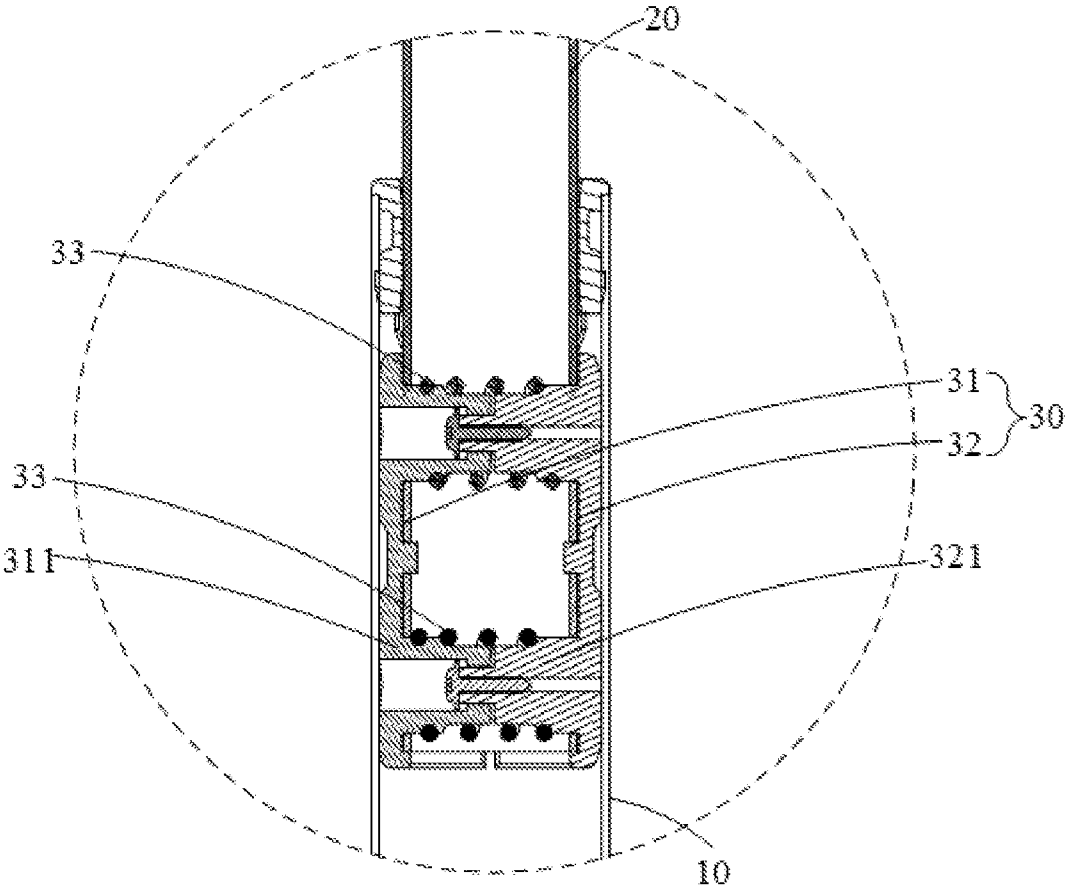
FIG. 3 is a partial sectional view of an embodiment of a tensile rod of the utility model.

Referring to FIGS. 1 to 3, in an embodiment of the utility model, the tensile rod includes a first pulling rod 10, a second pulling rod 20, and an extruding assembly 30. The first pulling rod 10 has a pulling end and an inserting end that are opposite to each other. An inserting end of the second pulling rod 20 is removably interposed in the first pulling rod 10. The extruding assembly 30 is mounted at the inserting end of the second pulling rod 20 and abuts against an inner wall of the first pulling rod 10 to provide a uniform extruding friction force from an outer peripheral wall of the inserting end of the second pulling rod 20 to an inner peripheral wall of the first pulling rod 10.

In this embodiment, both the first pulling rod 10 and the second pulling rod 20 can be arranged in a hollow long cylindrical shape and can be made of plastic, metal, or the like, which is not limited here. The second pulling rod 20 has a diameter slightly smaller than that of the first pulling rod 10.

The extruding assembly 30 can comprise a sleeve pipe and an elastic member, can also comprise a resilient end plug, an end cover or the like, or comprise another component having a certain resilient capacity and capable of providing a uniform extruding force from the outer peripheral wall of the second pulling rod 20 to the inner peripheral wall of the first pulling rod 10, which is not limited here.

In the technical solution of the utility model, the tensile rod includes the first pulling rod 10, the second pulling rod 20, and the extruding assembly 30. The first pulling rod 10 has the pulling end and the inserting end that are opposite to each other. The inserting end of the second pulling rod 20 is removably interposed in the first pulling rod 10. The extruding assembly 30 is mounted at the inserting end of the second pulling rod 20 and abuts against the inner wall of the first pulling rod 10 to provide the uniform extruding friction force from the outer peripheral wall of the inserting end of the second pulling rod 20 to the inner peripheral wall of the first pulling rod 10. The extruding assembly 30 is arranged between the first pulling rod 10 and the second pulling rod 20 to provide a uniform extruding pressure to the first pulling rod 10, so that a friction force between the first pulling rod 10 and the second pulling rod 20 is evenly distributed, thereby improving the stability of the tensile rod and extending service life.

Referring to FIG. 3, in an embodiment, a mounting hole is provided on both sides of the inserting end of the second pulling rod 20. The extruding assembly 30 includes a first friction seat 31, a second friction seat 32, and an elastic member 33. The first friction seat 31 is provided with a first connecting arm 311. A position of the second friction seat 32 corresponding, to the first connecting arm 311, is provided with a second connecting arm 321. The second friction seat 32 and the first friction seat 31 are enclosed to form a sleeve. The rod sleeve 11 is inserted at the inserting end of the second pulling rod 20 and is located between the first pulling rod 10 and the second pulling rod 20. The first connecting arm 311 and the second connecting arm 321 are inserted into the mounting hole respectively and abut against each other to form an extruding column. The elastic member 33 is sleeved on the extruding column.

In a telescoping process of the tensile rod, the elastic member 33 can provide a front stable and uniform extruding pressure to the inner peripheral wall of the first pulling rod 10 via the first friction seat 31 and the second friction seat 32, respectively, which can greatly provide the stability of the tensile rod and extend the service life.

In this embodiment, the elastic member 33 can be a spring or a plastic elastomer, or another component having a certain elasticity. The first friction seat 31 and the second friction seat 32 can both be arranged in a semi-circular tubular shape and can be combined to be assembled into a sleeve.

In order to facilitate installation and fixation, improve the stability of the first friction seat 31 and the second friction seat 32, and make the friction force between the first pulling rod 10 and the second pulling rod 20 are evenly distributed so as to further improve the stability of the tensile rod, in an embodiment, referring to FIG. 3, both sides of the inserting end of the second pulling rod 20 can be provided with the two mounting holes. The two first connecting arms 311 and the two second connecting arms 321 are provided so as to form two sets of extruding columns. The elastic member 33 is provided on each of the extruding columns.

The first connecting arm 311 and the second connecting arm 321 can be locked and fixed by a screw. Of course, in some other embodiments, the first connecting arm 311 and the second connecting arm 321 can also be fixed by a rivet, clamping connection, adhesive bonding or hot melt connection, and so on, which is not limited herein.

Figure 4:
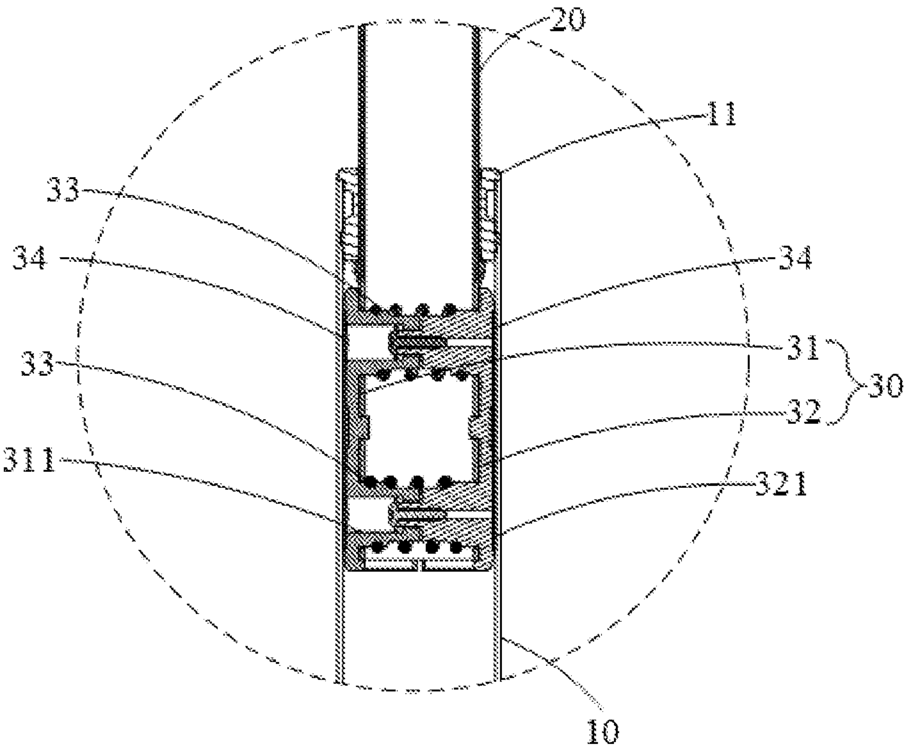
FIG. 4 is a partial sectional view of another embodiment of a tensile rod of the utility model.

Referring to FIG. 4, in an embodiment, the extruding assembly 30 can further include a friction sheet 34. The friction sheet 34 is arranged between the sleeve and the first pulling rod 10. In this way, the first friction seat 31 and the second friction seat 32 can be protected from being worn after long-term use, which affects the stability of the tensile rod as a whole. This further enhances the service life of the tensile rod.

In this embodiment, the friction sheet 34 can be a separate component. The two friction sheets 34 can be provided. The two friction sheets 34 are affixed to the first friction seat 31 and the second friction seat 32, respectively. Of course, in some other embodiments, one of the friction sheets 34 can be integral with the first friction seat 31, and the other of the friction sheets 34 can be integral with the second friction seat 32. No specific limitation is provided here.

The friction sheet 34 can be made of metal or plastic cement having an abrasion resistance property or the like, which is not limited herein.

Referring to FIG. 4, in an embodiment, a rod sleeve 11 can be provided at an end of the first pulling rod 10 near the second pulling rod 20 to limit the second pulling rod 20 from being escaped from the first pulling rod 10.

As seen in FIG. 4, the second pulling rod comprises a stop that is configured to interact with the rod sleeve 11 to prevent unwanted separation of the first pulling rod and the second pulling rod.

In this embodiment, the rod sleeve 11 also has a guiding function that guides the first pulling rod 10 to move, which can prevent the first pulling rod 10 from being deviated from a motion trajectory and damaging the extruding assembly 30 between the first pulling rod 10 and the second pulling rod 20, thereby improving the stability of the tensile rod and further extending the service life.

The present utility model also proposes a bracket, including a tensile rod. A specific structure of the tensile rod refers to the above embodiments. Since the bracket proposed by the present utility includes all the solutions of all the above embodiments of the tensile rod, the bracket has at least the same technical effect as the tensile rod, which is not described here.

The forgoing is only a preferred embodiment of the utility model and is not intended to limit the patent scope of the utility model. Under the inventive concept of the utility model, an equivalent structure variation made by the contents of the description and drawings of the utility model directly/indirectly applied to other related arts is included in the scope of patent protection of the utility model.

What is claimed is:

1. A tensile rod, comprising:

a first pulling rod;

a second pulling rod comprising a pulling end and an inserting end that are opposite to each other, and the inserting end of the second pulling rod being removably interposed in the first pulling rod; and an extruding assembly comprising:

a first friction seat comprising a first connecting arm;

a second friction seat comprising a second connecting arm at a position corresponding to the first connecting arm, the second friction seat and the first friction seat being enclosed to form a sleeve, the sleeve being sleeved at the inserting end of the second pulling rod and being located between the first pulling rod and the second pulling rod; the first connecting arm and the second connecting arm are coupled together by a fastener; and an elastic member sleeved over the first connecting arm and the second connecting arm;

wherein the extruding assembly abuts against an inner wall of the first pulling rod, and the extruding assembly is configured to provide a uniform extruding friction force from the inserting end of the second pulling rod to the inner wall of the first pulling rod.

2. The tensile rod according to claim 1, wherein the elastic member is a spring or a plastic elastomer.

3. The tensile rod according to claim 1, wherein two first connecting arms and two second connecting arms are both provided to form two sets of the extruding columns; and the elastic member is arranged on each of the extruding columns.

4. The tensile rod according to claim 1, wherein the extruding assembly further comprises a friction sheet, and the friction sheet is arranged between the sleeve and the first pulling rod.

5. The tensile rod according to claim 1, wherein one end of the first pulling rod near the second pulling rod is provided with a rod sleeve to limit the second pulling rod from being escaped from the first pulling rod.

6. The tensile rod according to claim 1, further comprising a bracket coupled to the first pulling rod, the second pulling rod, or both the first pulling rod and the second pulling rod.

7. A tensile rod, comprising:

a first pulling rod;

a second pulling rod comprising a pulling end and an inserting end that are opposite to each other, and the inserting end of the second pulling rod being removably interposed in the first pulling rod; and an extruding assembly comprising:

a first friction seat comprising a first connecting arm;

a second friction seat comprising a second connecting arm at a position corresponding to the first connecting arm, the second friction seat and the first friction seat being enclosed to form a sleeve, the sleeve being sleeved at the inserting end of the second pulling rod and being located between the first pulling rod and the second pulling rod; the first connecting arm and the second connecting arm are coupled together by a fastener, wherein the fastener comprises screw; a rivet; or the rivet and hot melt connection; and an elastic member sleeved over the first connecting arm and the second connecting arm;

wherein the extruding assembly abuts against an inner wall of the first pulling rod, two first connecting arms and two second connecting arms are both provided to form two sets of the extruding columns, and the elastic member is arranged on each of the extruding columns; and the extruding assembly is configured to provide a uniform extruding friction force from the inserting end of the second pulling rod to the inner wall of the first pulling rod.

8. The tensile rod according to claim 7, wherein two first connecting arms and two second connecting arms are both provided to form two sets of the extruding columns; and the elastic member is arranged on each of the extruding columns.

9. The tensile rod according to claim 7, wherein the extruding assembly further comprises a friction sheet, and the friction sheet is arranged between the sleeve and the first pulling rod.

10. The tensile rod according to claim 9, wherein two friction sheets are provided, the two friction sheets are affixed to the first friction seat and the second friction seat, respectively; or one of the friction sheets is integral with the first friction seat, and the other of the friction sheets is integral with the second friction seat.

* * * * *